(12) United States Patent
Twitchell, Jr. et al.

(10) Patent No.: US 9,295,099 B2
(45) Date of Patent: Mar. 22, 2016

(54) WAKE-UP BROADCAST INCLUDING NETWORK INFORMATION IN COMMON DESIGNATION AD HOC WIRELESS NETWORKING

(75) Inventors: Robert W. Twitchell, Jr., Cumming, GA (US); Khanh Mai, Alpharetta, GA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 13/555,897

(22) Filed: Jul. 23, 2012

(65) Prior Publication Data
US 2013/0223420 A1 Aug. 29, 2013

Related U.S. Application Data

(63) Continuation of application No. 12/353,197, filed on Jan. 13, 2009, now abandoned, which is a continuation of application No. PCT/US2008/054630, filed on Feb. 21, 2008.

(60) Provisional application No. 60/891,008, filed on Feb. 21, 2007.

(51) Int. Cl.
*H04L 12/28* (2006.01)
*H04W 4/00* (2009.01)
(Continued)

(52) U.S. Cl.
CPC .......... *H04W 84/18* (2013.01); *H04W 52/0235* (2013.01)

(58) Field of Classification Search
None
See application file for complete search history.

(56) References Cited

U.S. PATENT DOCUMENTS

| 3,805,265 A | 4/1974 | Lester |
| 4,165,024 A | 8/1979 | Oswalt et al. |

(Continued)

FOREIGN PATENT DOCUMENTS

| EP | 467036 A2 | 1/1992 |
| EP | 601820 A1 | 6/1994 |

(Continued)

OTHER PUBLICATIONS

"Written Opinion of the International Search Authority in Terahop Networks, Inc et al. International Application Serial No. PCT/US06/00868", Apr. 2, 2007, 3 pages.

(Continued)

*Primary Examiner* — Marsha D Banks Harold
*Assistant Examiner* — Christopher Wyllie
(74) *Attorney, Agent, or Firm* — Morris & Kamlay LLP

(57) ABSTRACT

A data communication device includes both a two-way communications component having a first receiver and transmitter, and a second receiver. The second receiver activates the two-way communications component from a dormant state upon receipt by the second receiver of a wake-up broadcast that includes a wake-up identifier of the data communication device. A method of providing information via the second receiver—which information is auxiliary to the wake-up of the two-way communications component—includes transmitting a wake-up broadcast capable of being received by the second receiver. The wake-up broadcast includes a data construct including a wake-up identifier and the auxiliary information. The wake-up identifier may or may not be a wake-up identifier of the data communication device. Nevertheless, the auxiliary information is received and recorded by the data communication device via the second receiver with the two-way communications component remaining in the dormant state.

30 Claims, 11 Drawing Sheets

(51) Int. Cl.
*H04W 84/18* (2009.01)
*H04W 52/02* (2009.01)

(56) References Cited

U.S. PATENT DOCUMENTS

| | | |
|---|---|---|
| 4,613,990 A | 9/1986 | Halpern et al. |
| 4,680,583 A | 7/1987 | Grover |
| 4,688,244 A | 8/1987 | Hannon et al. |
| 4,750,197 A | 6/1988 | Denekamp et al. |
| 4,817,537 A | 4/1989 | Cripe et al. |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany et al. |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent et al. |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,007 A | 3/1998 | Grushin et al. |
| 5,761,195 A | 6/1998 | Lu et al. |
| 5,790,946 A * | 8/1998 | Rotzoll ............ H04W 52/0229 455/343.1 |
| 5,793,882 A | 8/1998 | Piatek et al. |
| 5,833,910 A | 11/1998 | Teixido et al. |
| 5,862,803 A | 1/1999 | Von Czettriz et al. |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi et al. |
| 6,125,306 A | 9/2000 | Shimada et al. |
| 6,127,928 A | 10/2000 | Issacman et al. |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon et al. |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan et al. |
| 6,424,260 B2 | 7/2002 | Maloney et al. |
| 6,424,264 B1 | 7/2002 | Giraldin et al. |
| 6,427,913 B1 | 8/2002 | Maloney et al. |
| 6,437,692 B1 | 8/2002 | Huff et al. |
| 6,473,607 B1 | 10/2002 | Shohara et al. |
| 6,476,708 B1 | 11/2002 | Johnson et al. |
| 6,512,478 B1 | 1/2003 | Chien et al. |
| 6,529,142 B2 | 3/2003 | Yeh et al. |
| 6,542,114 B1 | 4/2003 | Eagleson et al. |
| 6,547,137 B1 | 4/2003 | Neff et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koerner et al. |
| 6,614,349 B1 | 9/2003 | Proctor et al. |
| 6,617,962 B1 | 9/2003 | Horwitz et al. |
| 6,665,585 B2 | 12/2003 | Kawase et al. |
| 6,700,533 B1 | 3/2004 | Werb et al. |
| 6,720,888 B2 | 4/2004 | Eagleson et al. |
| 6,737,974 B2 | 5/2004 | Dickinson et al. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Albanna et al. |
| 6,919,803 B2 | 7/2005 | Breed et al. |
| 6,927,688 B2 | 8/2005 | Tice et al. |
| 6,940,392 B2 | 9/2005 | Chan et al. |
| 6,975,614 B2 | 12/2005 | Kennedy et al. |
| 7,012,529 B2 | 3/2006 | Sajkowsky |
| 7,027,773 B1 | 4/2006 | McMillin et al. |
| 7,088,229 B2 | 8/2006 | Johnson et al. |
| 7,098,784 B2 | 8/2006 | Easley et al. |
| 7,103,344 B2 | 9/2006 | Menard et al. |
| 7,126,470 B2 | 10/2006 | Clift et al. |
| 7,142,121 B2 | 11/2006 | Chan et al. |
| 7,155,264 B2 * | 12/2006 | Twitchell, Jr. ................ 455/574 |
| 7,191,934 B2 | 3/2007 | Miller et al. |
| 7,196,622 B2 | 3/2007 | Lambright et al. |
| 7,209,468 B2 * | 4/2007 | Twitchell, Jr. ................ 370/338 |
| 7,209,771 B2 * | 4/2007 | Twitchell, Jr. ................ 455/574 |
| 7,212,122 B2 | 5/2007 | Gloekler et al. |
| 7,230,933 B2 | 6/2007 | Bahl et al. |
| 7,282,944 B2 | 10/2007 | Gunn et al. |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,440,781 B2 | 10/2008 | Beach et al. |
| 7,907,941 B2 * | 3/2011 | Twitchell, Jr. ................ 455/418 |
| 7,924,735 B2 * | 4/2011 | Sun et al. ................ 370/252 |
| 8,000,315 B2 * | 8/2011 | Doi et al. ................ 370/351 |
| 8,125,978 B2 * | 2/2012 | Lim et al. ................ 370/351 |
| 2001/0000019 A1 | 3/2001 | Bowers et al. |
| 2001/0050550 A1 | 12/2001 | Yoshida et al. |
| 2002/0039896 A1 | 4/2002 | Brown et al. |
| 2002/0050632 A1 | 5/2002 | Tuttle et al. |
| 2002/0089434 A1 | 7/2002 | Ghazarian et al. |
| 2002/0098861 A1 | 7/2002 | Doney et al. |
| 2002/0146985 A1 | 10/2002 | Naden et al. |
| 2003/0008692 A1 | 1/2003 | Phelan et al. |
| 2003/0083064 A1 | 5/2003 | Cooper |
| 2003/0140135 A1 * | 7/2003 | Okuyama et al. ............. 709/223 |
| 2003/0141973 A1 | 7/2003 | Yeh et al. |
| 2003/0144020 A1 | 7/2003 | Challa et al. |
| 2003/0179073 A1 | 9/2003 | Ghazarian et al. |
| 2003/0182077 A1 | 9/2003 | Emord et al. |
| 2003/0202477 A1 * | 10/2003 | Zhen et al. ................ 370/248 |
| 2003/0209601 A1 | 11/2003 | Chung et al. |
| 2003/0236077 A1 | 12/2003 | Sivard et al. |
| 2004/0021572 A1 | 2/2004 | Schoen et al. |
| 2004/0041731 A1 | 3/2004 | Hisano et al. |
| 2004/0100394 A1 | 5/2004 | Hitt et al. |
| 2004/0100415 A1 | 5/2004 | Veitch et al. |
| 2004/0119588 A1 | 6/2004 | Marks et al. |
| 2004/0121793 A1 | 6/2004 | Weigele et al. |
| 2004/0135691 A1 | 7/2004 | Duron et al. |
| 2004/0143750 A1 * | 7/2004 | Kulack et al. ................ 713/200 |
| 2004/0183673 A1 | 9/2004 | Nageli et al. |

(56) References Cited

U.S. PATENT DOCUMENTS

| | | | |
|---|---|---|---|
| 2004/0232924 A1 | 11/2004 | Hilleary et al. | |
| 2004/0233041 A1 | 11/2004 | Bohman et al. | |
| 2004/0233054 A1 | 11/2004 | Neff et al. | |
| 2004/0246463 A1 | 12/2004 | Milinusic et al. | |
| 2005/0043068 A1 | 2/2005 | Shohara et al. | |
| 2005/0073406 A1 | 4/2005 | Easley et al. | |
| 2005/0087235 A1 | 4/2005 | Skorpik et al. | |
| 2005/0088299 A1 | 4/2005 | Bandy et al. | |
| 2005/0090211 A1 | 4/2005 | Lilja et al. | |
| 2005/0093702 A1* | 5/2005 | Twitchell, Jr. | 340/572.8 |
| 2005/0128080 A1 | 6/2005 | Hall et al. | |
| 2005/0145018 A1 | 7/2005 | Sabata et al. | |
| 2005/0146445 A1 | 7/2005 | Sleboda et al. | |
| 2005/0157659 A1* | 7/2005 | Huitema | 370/254 |
| 2005/0190759 A1 | 9/2005 | Lee et al. | |
| 2005/0199716 A1 | 9/2005 | Shafer et al. | |
| 2005/0215280 A1* | 9/2005 | Twitchell, Jr. | 455/553.1 |
| 2005/0226201 A1 | 10/2005 | McMillin et al. | |
| 2005/0261037 A1 | 11/2005 | Raghunath et al. | |
| 2005/0270160 A1 | 12/2005 | Chan et al. | |
| 2006/0007863 A1* | 1/2006 | Naghian | 370/238 |
| 2006/0109106 A1 | 5/2006 | Braun et al. | |
| 2006/0114102 A1 | 6/2006 | Chang et al. | |
| 2006/0135145 A1 | 6/2006 | Redi et al. | |
| 2006/0163422 A1 | 7/2006 | Krikorian et al. | |
| 2006/0164232 A1 | 7/2006 | Waterhouse et al. | |
| 2006/0164239 A1 | 7/2006 | Loda et al. | |
| 2006/0239197 A1* | 10/2006 | Lieuallen et al. | 370/238 |
| 2006/0270382 A1 | 11/2006 | Lappetelainen et al. | |
| 2007/0008408 A1 | 1/2007 | Zehavi et al. | |
| 2007/0032951 A1 | 2/2007 | Tanenhaus et al. | |
| 2007/0135179 A1 | 6/2007 | Hardman et al. | |
| 2007/0195702 A1* | 8/2007 | Yuen et al. | 370/238 |
| 2008/0291844 A1* | 11/2008 | Krause | 370/254 |
| 2009/0129306 A1* | 5/2009 | Twitchell et al. | 370/311 |
| 2013/0223420 A1* | 8/2013 | Twitchell et al. | 370/338 |

FOREIGN PATENT DOCUMENTS

| | | | | |
|---|---|---|---|---|
| EP | | 748083 A1 | 12/1996 | |
| EP | | 748085 A1 | 12/1996 | |
| EP | | 829995 A2 | 3/1998 | |
| EP | | 944014 A2 | 9/1999 | |
| EP | | 1317733 A2 | 6/2003 | |
| EP | | 1692599 A2 | 8/2006 | |
| EP | | 1692668 A2 | 8/2006 | |
| GB | | 2308947 A | 7/1997 | |
| KR | | 20050102419 | 10/2005 | |
| KR | | 20070005515 A | 1/2007 | |
| WO | | 2000068907 A1 | 11/2000 | |
| WO | | 2000069186 A1 | 11/2000 | |
| WO | | 03098175 A1 | 11/2003 | |
| WO | WO 2006056174 A1 * | | 6/2006 | H04B 7/26 |

OTHER PUBLICATIONS

"Written Opinion of the International Search Authority in Terahop Networks, Inc et al. International Application Serial No. PCT/US06/26158", Nov. 21, 2006, 7.

Easley,, "U.S. Appl. No. 60/499,338", Sep. 3, 2003.

Garcia-Luna-Aceves, J.J. et al., "Source-Tree Routing in Wireless Networks", 1999, 10 pages.

Gu, Daniell.,, "C-ICAMA, A Centralized Intelligent Channel Assigned Multiple Access for Multi-Layer Ad-Hoc Wireless Networks with UAVs", 2000, 6 pages.

Gu, Daniell. et al., "Hierarchical Routing for Multi-Layer Ad-Hoc Wireless Networks with UAVs", 200, 5 pages.

Guangyu, Pei et al., "A Wireless Hierarchical Routing Protocol with Group Mobility", IEEE, 1998, 5 pages.

Haartsen, Jaap et al., "Bluetooth: Vision, goals and Architecture, Mobile Computing & Communications Review", vol. 1, No. 2,, 1998, 8 pages.

Haartsen, Jaap "BlueTooth—The Universal Radio Interface for Ad Hoc, Wireless Connectivity", Ericsson Review No. 3, 1998, 110-117.

Hubaux, Jean-Pierre et al., "Toward self-Organized Mobile Ad Hoc Networks: The Teminodes Project", IEEE Communications Magazine, Jan. 2001, pp. 118-124.

Iwata, Atsuchi et al., "Scalable Routing Strategies foe Ad Hoc Wireless Networks,", IEEE Journal on Selected Areas in Communications , vol. 17, No. 8, Aug. 1999, pp. 1369-1379 Dec. 1, 2015.

Jiang, Mingliang,, "Cluster Based Routing Protocol", National University of Singaporte, Jul. 1999, Internet Draft.

Keshavarzian "Energy-Efficient Link Assessment in Wireless Sensor Networks", INFOCOM 23rd Annual Joint Conference of the IEEE computer and Communications Societies, vol. 3, 2004, 1751-1761.

Lee, Sung-Ju,, "On-Demand Multicast Routing Protocol (ODMRP) for Ad Hoc Networks", http://www.cs.ucla.edu/NR/wireless/Paper/draft-ietf-manet-admrp-02.txt, Jan. 2000.

Melodia et al., "On the interdependence of Distributed Topology Control and Geographical Routing in Ad Hoc and Sensor Networks, Selected Areas in Communications", IEEE Journal, vol. 23, Issue 3, Mar. 2005, pp. 101-106.

Morgan, Gary,, "Miniature Tags Provide Visibility & Cohesion for an LIA Battalion Level", Proof of Principle, Pacific NW National Laboratory, Gary.morgan@pnl.gov, Apr. 2001.

Nageli,, "U.S. Appl. No. 60/444,029", Jan. 31, 2003.

Pei, Guangyu et al., "Mobility Management in Hierarchical Multihop Mobile Wireless Networks", 1999, 6 pages.

Perkins, C. "Mobile Ad Hoc Networking Terminology", http://www/iprg/nokia.com/charliep/txt/manet/term.txt, Nov. 17, 1998, 8 pages.

Perkins, Charlese.,, Ad Hoc Networks, Jan. 2001, Table of Contents, Chapters 1, 4 and 11.

Ramanathan, Ram et al., "Hierarchical-Organized, Multihop Mobile Wireless Networks for Quality-of-Service Support", 1998, 1-35 pages.

Sharp, Kevin "Physical Reality: A Second Look, Supply Chain Systems", http://www.idsystems.com/reader/1999_03/phys0399_pt2/index.htm, Helmers Publishing, Inc, Mar. 1999.

Sommer, Ben et al., "Group 4, Passive RF Tags".

Stojmenovic et al., "Design Guidelines for Routing Protocols in Ad Hoc and Sensor Networks with a Realistic Physical Layer", Communications Magazine, IEEE, vol. 43, Issue 43. Issue 3,, Mar. 2005, 101-106.

Valdevit, Ezio,, "Cascading in Fibre Channel: How to Build a Multi-Switch Fabric", pp. 1-12.

* cited by examiner

Exemplary Table of Wake-Up Identifiers for Node N2

| Wake-Up Identifiers | Status | Description |
|---|---|---|
| 0101 | Inactive | Node N1 with Unique ID 101 |
| 0102 | Active | Node N2 with Unique ID 102 |
| 0103 | Inactive | Node N3 with Unique ID 103 |
| 0104 | Inactive | Node N4 with Unique ID 104 |
| 0105 | Inactive | Node N5 with Unique ID 105 |
| ... | | |
| 0801 | Inactive | Gateway G1 with Unique ID 801 |
| 0802 | Inactive | Gateway G2 with Unique ID 802 |
| 0803 | Inactive | Gateway G3 with Unique ID 803 |
| ... | | |
| 1000 | Active | Wake-Up (generic to all nodes) |
| 1001 | Inactive | Common Designation: Circle |
| 1002 | Active | Common Designation: Polygon |
| 1003 | Inactive | Common Designation: Rectangle *(subset of Polygon)* |
| 1004 | Inactive | Common Designation: Square *(subset of Rectangle)* |
| 1005 | Active | Common Designation: Triangle *(subset of Polygon)* |
| 1006 | Active | Common Designation: Isosceles Triangle *(subset of Triangle)* |
| ... | | |
| 3001 | Active | Node Attribute: Communications with gateway available |
| 3002 | Active | Node Attribute: Direct Communications with gateway |
| ... | | |

*FIG. 10*

Exemplary Table of Wake-Up Identifiers for Gateway G1

| Wake-Up Identifier | Status | Description |
|---|---|---|
| 0101 | Inactive | Node N1 with Unique ID 101 |
| 0102 | Inactive | Node N2 with Unique ID 102 |
| 0103 | Inactive | Node N3 with Unique ID 103 |
| 0104 | Inactive | Node N4 with Unique ID 104 |
| 0105 | Inactive | Node N5 with Unique ID 105 |
| ... | ... | ... |
| 0801 | Active | Gateway G1 with Unique ID 101 |
| 0802 | Inactive | Gateway G2 with Unique ID 102 |
| 0803 | Inactive | Gateway G3 with Unique ID 103 |
| ... | ... | ... |
| 1000 | Active | Wake-Up (generic to all nodes) |
| 1001 | Active | Common Designation: Circle |
| 1002 | Active | Common Designation: Polygon |
| 1003 | Active | Common Designation: Rectangle *(subset of Polygon)* |
| 1004 | Active | Common Designation: Square *(subset of Rectangle)* |
| 1005 | Active | Common Designation: Triangle *(subset of Polygon)* |
| 1006 | Active | Common Designation: Isosceles Triangle *(subset of Triangle)* |

*FIG. 11*

WAKE-UP BROADCAST INCLUDING NETWORK INFORMATION IN COMMON DESIGNATION AD HOC WIRELESS NETWORKING

CROSS-REFERENCE TO RELATED APPLICATION

The present application is a U.S. continuation patent application of, and claims priority under 35 U.S.C. §120 to, U.S. nonprovisional patent application Ser. No. 12/353,197, filed Jan. 13, 2009 now abandoned, which published as USPA Pub. No. 2009/0129306, and which '197 application is a U.S. continuation patent application of, and claims priority under 35 U.S.C. §120 to, international patent application serial number PCT/US2008/054630 filed on Feb. 21, 2008, and designating the United States, which published as WO2008/103861 on Aug. 28, 2008, and which is a U.S. nonprovisional patent application of, and claims priority under 35 U.S.C. §119(e) to, U.S. provisional patent application Ser. No. 60/891,008, filed Feb. 21, 2007. Each of these patent applications and patent application publications are hereby incorporated herein by reference.

The present application incorporates herein by reference each of: U.S. Pat. Nos. 6,745,027; 6,934,540; 7,209,771; and 7,221,668 as well as U.S. Patent Appl. Publication Nos. 2006/0276161; 2006/0287008; 2007/0002792; and 2007/0155327.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Wireless ad hoc networks comprise nodes that communicate without central control or wired infrastructure. Such networks may have dynamic, randomly-changing, multihop topologies composed of wireless data communication links between the nodes. Ad hoc networks are advantageous because they are inexpensive, fault-tolerant, and flexible.

The present invention relates to improvements in wireless ad hoc networks and, in particular, improvements in such networks that utilize common designation networking.

SUMMARY OF THE INVENTION

The present invention broadly relates to improved common designation networking and common designation networks and, in particular, to wireless communications utilizing improved common designation networking and common designation networks within wireless ad hoc networking environments.

Broadly described, the present invention includes many aspects and features.

The invention relates to ad hoc wireless networking utilizing a data communication device as a node of the network, wherein the data communication device includes both a two-way communications component comprising a first receiver and transmitter, and a second receiver, and wherein the second receiver activates the two-way communications component from a dormant state upon receipt by the second receiver of a wake-up broadcast that includes a wake-up identifier of the data communication device.

In accordance with an aspect of the invention, a method of providing information via the second receiver—which information is auxiliary to the wake-up of the two-way data communications component—includes transmitting a wake-up broadcast. The wake-up broadcast is capable of being received by the second receiver if in broadcast range, and the wake-up broadcast includes a data construct comprising a wake-up identifier and the auxiliary information. The wake-up identifier may or may not be the wake-up identifier of the data communication device. Nevertheless, the auxiliary information is received and recorded by the data communication device via the second receiver with the two-way communications component remaining in the dormant state.

In another aspect of the invention, a method of receiving information by the data communication device via the second receiver—which information is auxiliary to the wake-up of two-way communications component—includes the steps of: receiving a wake-up broadcast, the wake-up broadcast including a data construct comprising a wake-up identifier and the auxiliary information; storing the auxiliary information in memory of the data communication device; and activating the two-way communications component from a dormant state, in response to receipt of the wake-up broadcast, if a wake-up identifier of the data communications device is found in the wake-up broadcast, and not activating the two-way communications component from a dormant state, in response to receipt of the wake-up broadcast, if a wake-up identifier of the data communications device is not found in the wake-up broadcast.

In features of these aspects, the auxiliary information comprises a node identification from which the wake-up broadcast is transmitted; the auxiliary information comprises a transmission count regarding wake-up broadcasts transmitted by a node; the auxiliary information comprises an encryption key; the auxiliary information comprises application specific data; and/or the auxiliary information comprises an indication of the status of a sensor In additional features, the second receiver draws substantially less current while listening for a wake-up broadcast than the two-way communications component would draw while listening for a wake-up broadcast; the second receiver draws less current while listening for a wake-up broadcast than the two-way communications component would draw while listening for a wake-up broadcast, the difference in current draw being at least an order of magnitude (such as milliamps versus microamps); and/or the second receiver utilizes a stepped wake-up sequence based on at least two criteria, and wherein the last criteria before awakening the two-way communications component comprises identifying a wake-up identifier of the data communication device in the wake-up broadcast.

In another feature, of these aspects, the second receiver is part of a wake-up transceiver, and the wake-up transceiver further comprises a second transmitter of the data communication device that is configured to transmit a wake-up broadcast for receipt by another wake-up receiver of another data communication device.

In various implementations of these aspects, the data communication device is a node in a common designation wireless ad hoc sensor network; and/or the data communication device is a node in a class based wireless ad hoc network.

In yet additional features of these aspects, the auxiliary information is used by the data communication device for facilitating network communications by the two-way communications component. In this regard, the auxiliary information may include network information that is reviewed by the data communication device when determining network paths for communicating with a desired node, whereby network communications are facilitated. The network information may include: the identification of one or more nodes that are within direct communication range of the data communication device; the identification of a gateway node that is within direct communication range of the data communication device; the identification of one or more nodes from which wake-up broadcasts have been received, either directly or indirectly, by the second wake-up receiver; and/or the identification of one or more common designations from which wake-up broadcasts have been received, either directly or indirectly, by the second wake-up receiver.

Another aspect of the invention includes computer executable instructions stored in a computer readable medium for performing any of the foregoing aspects and features, including any combinations thereof.

In yet another aspect of the invention, an ad hoc wireless network system includes an ad hoc wireless network utilizing a plurality of data communication devices as nodes of the network; wherein each data communication device includes both a two-way communications component, comprising a first receiver and transmitter, and a second receiver, wherein the second receiver activates the two-way communications component from a dormant state upon receipt by the second receiver of a wake-up broadcast that includes a wake-up identifier of the data communication device; and wherein information is provided via each second receiver, which information is auxiliary to the wake-up of the two-way communications component, by transmitting a wake-up broadcast, which the second receiver is capable of receiving, that includes a data construct comprising a wake-up identifier and the auxiliary information.

In still another aspect of the invention, a data communication device for utilization as a node in an ad hoc wireless network includes a two-way communications component comprising a first receiver and transmitter; and a second receiver, wherein the second receiver activates the two-way communications component from a dormant state upon receipt by the second receiver of a wake-up broadcast that includes a wake-up identifier of the data communication device; wherein information is provided via the second receiver, which information is auxiliary to the wake-up of the two-way communications component, by transmitting a wake-up broadcast, which the second receiver is capable of receiving, that includes a data construct comprising a wake-up identifier and the auxiliary information.

In addition to the aforementioned aspects and features of the invention, it should be noted that the invention further includes the various possible combinations of such aspects and features, including the combinations of such aspects and features with those aspects and features of the incorporated references from which priority is claimed.

BRIEF DESCRIPTION OF THE DRAWINGS

Particular embodiments of the invention are to be understood according to the detailed descriptions that follow in conjunction with the attached figures, wherein:

FIG. 10 illustrates an exemplary table of wake-up identifiers that may be maintained by node N2 in accordance with the present invention.

FIG. 11 illustrates an exemplary table of wake-up identifiers that may be maintained by gateway G1 in accordance with the present invention.

DETAILED DESCRIPTION

Figure 1:
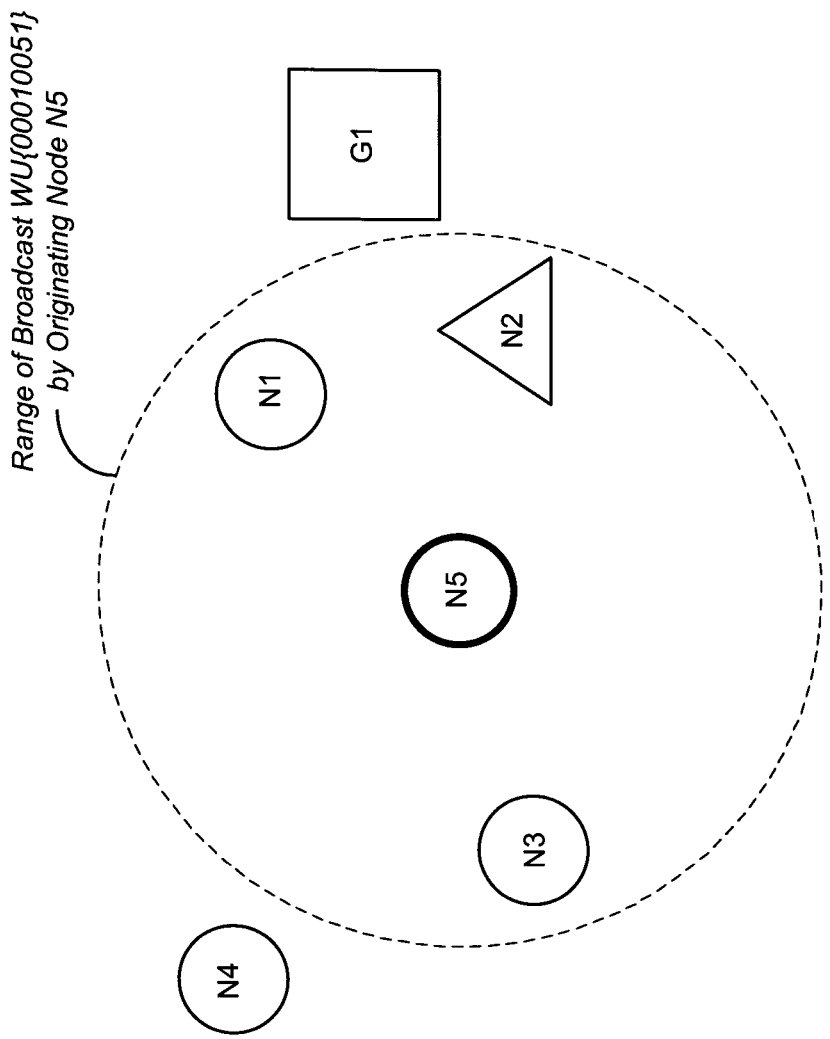
FIG. 1 illustrates a plurality of nodes that form wireless ad hoc networks in accordance with common designation networking, wherein node N5 is sending out a wake-up broadcast to nodes having the "circle" common designation.

As a preliminary matter, it will readily be understood by one having ordinary skill in the relevant art ("Ordinary Artisan") that the present invention has broad utility and application. Various embodiments are discussed for illustrative purposes in providing a full and enabling disclosure of the present invention. Moreover, many embodiments, such as adaptations, variations, modifications, and equivalent arrangements, will be implicitly disclosed by the descriptions of embodiments herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to the drawings, FIGS. 1-6 each illustrate a plurality of nodes that form wireless ad hoc networks in accordance with common designation networking. The nodes in FIGS. 1-6 comprise nodes N1, N2, N3, N4, N5 and a gateway node G1. In each illustration, each node N1, N2, N3, N4 and N5 has a particular shape (a circle or a triangle), indicating a particular common designation that applies to that node, and the gateway node G1 has a square shape. In FIGS. 1-6, some of the shapes are shown with visual emphasis (i.e., with thicker lines, sometimes referred to herein as being shown in bold), indicating generally that the nodes represented by those shapes are active as set forth hereinbelow.

In accordance with the invention, a "node" generally refers to a wireless radio frequency data communication device that comprises a two-way communications component in the form of a transceiver that receives and transmits information wirelessly with one or more other nodes. The data communication device preferably includes a low-power radio frequency ("LPRF") data communication device that communicates via data packets. The transmission of the data packets may utilize, for example, transmission control protocol ("TCP"). The two-way communications component of the data communication device also preferably is a standards-based radio ("SBR") and comprises, for example, a WiFi, WiMAX, CDMA, WCDMA, GSM, Zibee, Ultra-Wideband, or Bluetooth radio. Indeed, in connection with the one or more preferred embodiments described below, the SBR preferably comprises a Bluetooth radio.

Generally, in receiving or transmitting information wirelessly between two nodes, a communications link is established between the SBRs of the two nodes and an electronic message then is transmitted via the communications link. Following transmission of the electronic message, the communications link is disconnected and the SBRs return to an inactive state for power conservation. Alternatively, the communications link established between the data communication devices of the two nodes may be maintained, if desired, in order to provide continuous communications between the two nodes without having to reestablish a communications link therebetween. Establishing a continuous communications link between two nodes without having to reestablish the communications link therebetween is particularly desirable, for instance, in transmitting real time audiovisual content, or in providing real time audiovisual communications between persons. Such person-to-person communications further may be "two-way" when each data communication device at each node includes dual radios. This is particularly true when Bluetooth radios are utilized, which do not include duplex capabilities. Thus, for example, maintaining continuous communications between two nodes each employing dual radios is particularly desirable if data packets for Voice-over-IP ("VoIP") services are to be wirelessly transmitted between the two nodes. Once the continuous communications are no longer needed, the communications link is disconnected and the SBRs return to an inactive state for power conservation.

The data communication device of a node of the wireless network may be mobile or fixed at a particular location, and the data communication device may include an internal power supply source or utilize an external power supply source. The data communication device also may include an interface for communicating with an associated sensor or other data acquisition device, which sensor may or may not form part of the node. The data communication device constituting the node also or alternatively may be attached to an asset that is to be monitored and/or tracked; alternatively, the data communication device constituting the node may be permanently affixed to a structure for monitoring and/or tracking assets that come within proximity thereto.

With respect to a "gateway" node, the gateway node preferably is configured for direct electronic communication with a network that is external to any ad hoc wireless network that may be formed by the nodes themselves. Communications between the gateway and the external network may be wireless or hard wired and comprise, for example, a network interface card that accepts a CAT 5 cable for Ethernet communications; a cellular transceiver for communications via a cellular telephone network; a satellite transceiver for communications via a satellite network; or any combination thereof. The wired network itself may be a wide area network ("WAN") and include the Internet. Such a node is called a "gateway" node because it serves as a gateway for other nodes in communicating via the external network. A computer system further may be disposed in electronic communication with the same wired network, whereby the computer system and each node of the wireless network may communicate with each other through the external network, such as the WAN, and the one or more gateways. Moreover, the computer system may include application software and a database, and the computer system may record and maintains information regarding the wireless network, nodes thereof, and/or data received therefrom. Such a computer system is sometimes referred to as a "server" and may be utilized to track and/or monitor asset that may be associated with the nodes. If the nodes are utilized simply for monitoring purposes irrespective of assets, such a server may be utilized for responding to conditions that are sensed by one or more of then nodes, including alerting appropriate third parties to a sensed condition.

In alternative embodiments, the server may be combined with a gateway node itself, which combination sometimes may be referred to as a "gateway controller" or "GC". In such embodiments the gateway controller performs the aforementioned functions of the server. Also, the gateway controller preferably is still configured to communicate with an external network WAN, thereby providing an avenue for communicating from remote locations via the WAN with the gateway controller in order to access information that is recorded and maintained by the gateway controller.

In accordance with the invention, the nodes utilize common designation networking in combination with wake-up technologies. Common designation networking is perhaps best disclosed in the incorporated U.S. Pat. Nos. 6,745,027 and 7,221,668. When the nodes are associated with assets, common designation identifiers representing attributes or characteristics of the assets are typically used, which common designations often are referred to as "class" designations. Similarly, ad hoc networks formed based thereon are often referred to as "class-based" networks and communications in such networks are often referred to as "class-based" communications. In accordance with common designation networking, a node screens each transmission for a data identifier that represents a common designation of that node. The node does not process, route, or respond to an incoming transmission if the data identifier is not found. As will be appreciated, common designation networking greatly reduces RF noise when many nodes are within broadcast range of each other and greatly increase operating life of mobile nodes that dependent on battery sources, as the nodes do not needlessly respond to all transmissions, filtering out and processing, routing, and/or responding to only those transmission bearing its common designation.

As further disclosed in the incorporated references, it will be appreciated that a node may have more than one common designation at any given time, and that a common designation may represent a subset or a superset of another common designation (sometimes referred to as class and subclass).

The wake-up technologies that are utilized in accordance with the invention are perhaps best disclosed in U.S. Pat. No. 7,209,771 and U.S. Patent Appl. Publication No. 2006/0287008. These two incorporated references disclose alternative approaches for the wake-up technologies that may be used.

Specifically, in incorporated U.S. Pat. No. 7,209,771, each node of the wireless ad hoc network includes—in connection with the SBR—a wake-up receiver that listens for a wake-up broadcast or signal, referred to generally as a "wake-up broadcast," that includes a common designation of that node. Upon receiving such a wake-up broadcast, the wake-up receiver provides an electronic signal that activates the SBR, which resides in a dormant state (either off or in a reduced power standby mode) while the wake-up receiver is listening for an applicable broadcast. The wake-up receiver is a simplified receiver that draws much less current when listening for an applicable broadcast compared to the current that would be drawn by the SBR when listening for an applicable broadcast. Hence, significant power conservation and long battery life is achieved using such a wake-up receiver.

Furthermore, this wake-up receiver may screen only for a predetermined common designation, as disclosed in U.S. Patent Appl. Publication No. 2006/0287008. Alternatively, a more complicated stepped wake up of the SBR may be performed using the wake-up receiver, wherein the wake-up receiver first screens for one or more criteria before screening for the common designation in the wake-up broadcast. Such a stepped wake-up methodology is disclosed, for example, in the incorporated U.S. Patent Appl. Publication No. US 2006/0276161. Screening for criteria that is indicative of an actual wake-up broadcast being received can be beneficial when significant RF noise is present, whereby false indications of the receipt of a wake-up broadcast can be reduced.

In incorporated U.S. Patent Appl. Publication No. 2006/0287008, a wake-up transceiver is disclosed. The wake-up transceiver is similar to the aforementioned wake-up receiver, but further includes a transmitter by which a wake-up broadcast may be transmitted without necessarily having to activate the SBR. In the data communication devices of U.S. Pat. No. 7,209,771, the SBR sends a wake-up broadcast whereas, in U.S. Patent Appl. Publication No. 2006/0287008, the wake-up broadcast may be sent by the wake-up transceiver without having to activate the SBR. Avoiding booting up of the SBR has been found to result in significant power savings, and while the SBR has additional features and functionality not provided by the wake-up transceiver, such features and functionality are not required in transmitting a wake-up broadcast.

As used herein, "Wake-Up Component" is intended to mean either a wake-up receiver or wake-up transceiver, as disclosed in these incorporated references, the data communication device of each node of FIG. 1 preferably includes such a Wake-Up Component.

Turning now to FIG. 1, node N5 is illustrated in bold, which represents that the SBR of node N5 is active. More particularly, node N5 is transmitting a wake-up broadcast ("WU") to nodes in the broadcast range that have a "circle" common designation. The nodes within the broadcast range of node N5 are illustrated within the dashed circle of which node N5 is located at the center. Those nodes include nodes N1, N2, and N3, all of which include a dormant SBR as indicated by the lack of bold emphasis, and the wake-up broadcast is received by the Wake-Up Component of each of these nodes.

Figure 7:
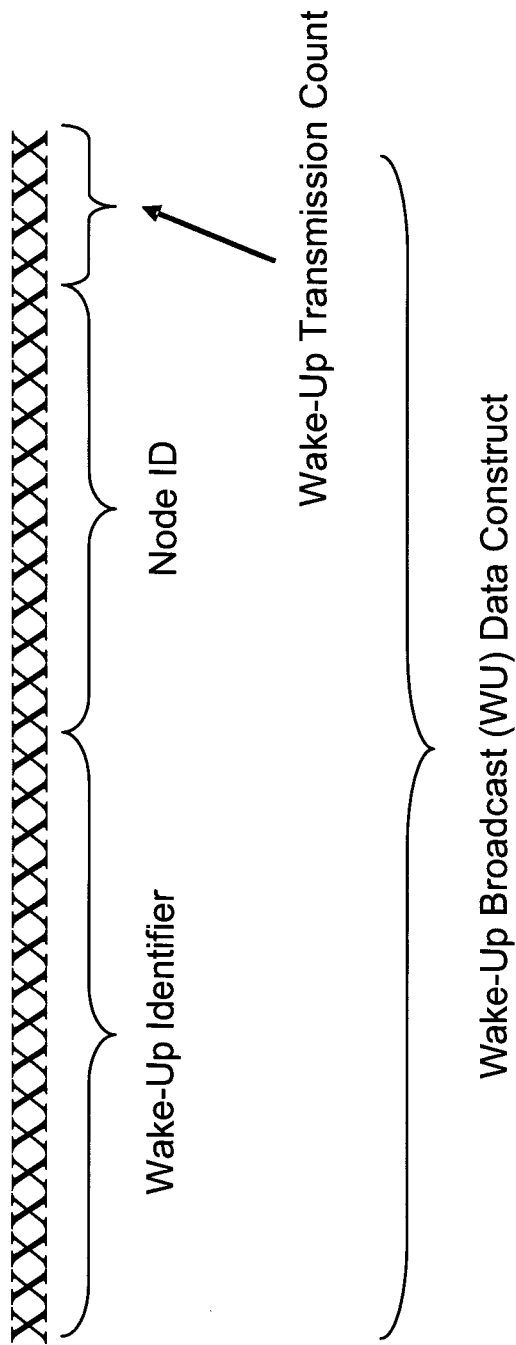
FIG. 7 illustrates a first exemplary data construct that is included in the wake-up broadcast in accordance with the present invention.

In accordance with an exemplary implementation, the wake-up broadcast includes the data construct with the hexadecimal value "00010051" as illustrated in FIG. 1. The pieces of information contained within the data construct in this exemplary implementation of the wake-up broadcast is illustrated in FIG. 7. As shown therein, the first sixteen bits (i.e., the first four digits of the hexadecimal value shown in FIG. 1) represent the wake-up identifier portion of the wake-up broadcast. The next twelve bits (i.e., the next three digits of the hexadecimal value shown in FIG. 1) represent an identification of the node initiating the wake-up broadcast. Finally, the last four bits (i.e., the final digit of the hexadecimal value shown in FIG. 1) represent a rolling transmission or message count sent by the originating node. Accordingly, in interpreting the data construct with the hexadecimal value "00010051" illustrated in FIG. 1, the first four digits "0001" identify the common designation (in this case, defined as corresponding to the "circle" common designation); the next three digits "005" identify the node (in this case, defined as corresponding to N5) that is initiating the wake-up broadcast; and the last digit identifies a transmission or message count of "1". For reference, various common designations, node IDs, and gateway IDs in an exemplary implementation are shown in the tables of FIGS. 10 and 11, and are exemplary in nature only.

As will now be apparent, the wake-up broadcast includes information in addition to that which is required merely to effect the wake-up of desired nodes. In particular, the wake-up broadcast includes networking information that may assist any node listening to the wake-up broadcast in facilitating networking communications itself.

Figure 2:
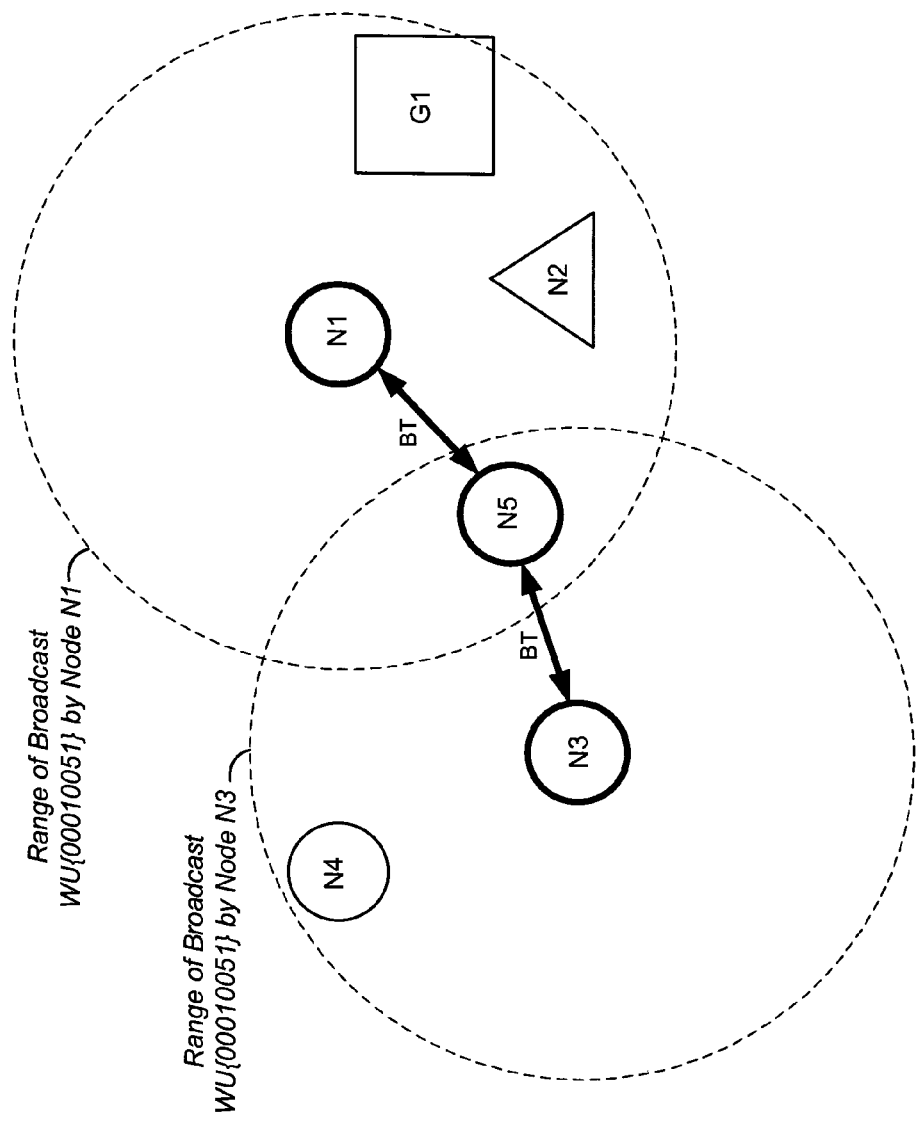
FIG. 2 illustrates the nodes of FIG. 1, wherein each of nodes N1 and N3 propagates the wake-up broadcast from node N5 and wherein each of nodes N1 and N3 engages in Bluetooth communications with node N5.

Continuing with reference to FIG. 1, nodes N1 and N3 each have the common designation of "circle," which is the common designation identified in the wake-up broadcast transmitted by Node N5. Thus, as shown in FIG. 2, the SBRs of these two nodes are awakened by their respective Wake-Up Components and (1) each propagates the wake-up broadcast received from node N5 by transmitting a wake-broadcast with the same data construct value 00010051; and (2) each engages in Bluetooth communications with Node N5 via the SBRs. The awakened state of the SBRs in nodes N1 and N3, as well as that of node N5, is represented by the bold emphasis of nodes N1, N3 and N5 in FIG. 2.

It furthermore will be appreciated that, while node N2 was within the range of the wake-broadcasts of nodes N5 and N1, respectively, no common designation of node N2 was included in the data construct of either broadcast. Thus, node N2 did not "wake up" in response to either broadcast. On the other hand, node N2 has "heard" the wake-up broadcasts and has made note of the following networking information revealed by such wake-up broadcasts: (1) the presence of node N5 having the "circle" common designation within one hop from node N2; and (2) the presence of another node having the "circle" common designation within the broadcast range of node N2.

It will still further be appreciated that

Figure 3:
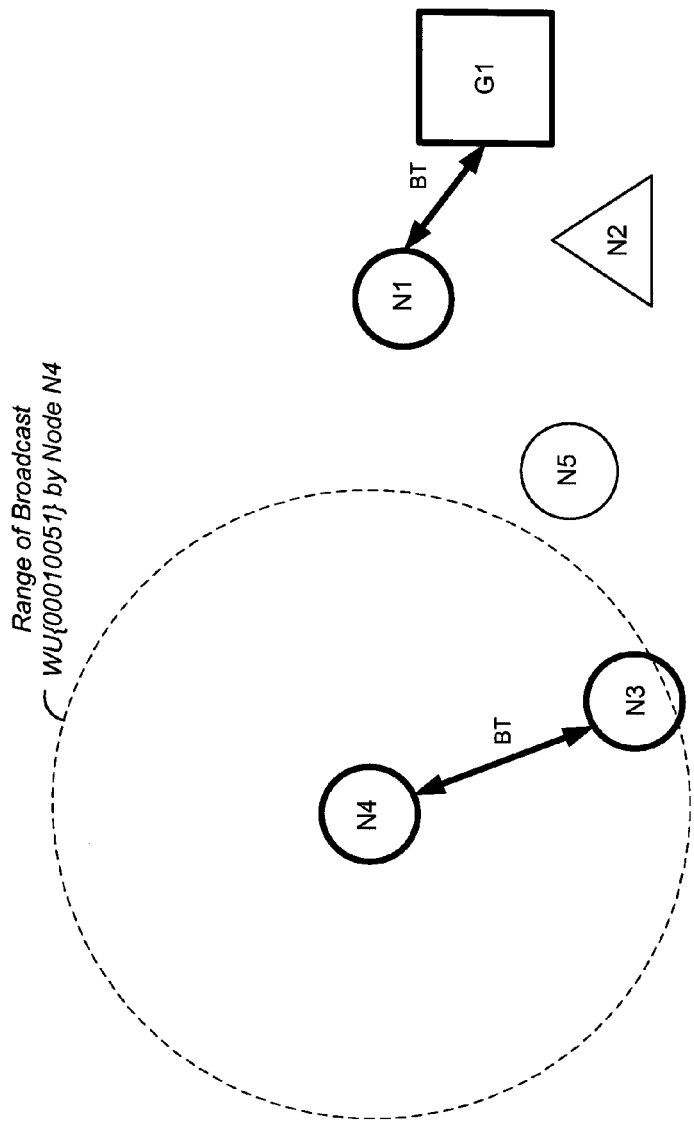
FIG. 3 illustrates the nodes of FIG. 1, wherein node N4 propagates the wake-up broadcast from node N5 and engages in Bluetooth communications with node N3, and wherein node N1 engages in Bluetooth communications with gateway G1.

FIG. 3 represents the next sequence of events following those of FIG. 2. In this regard, FIG. 3 illustrates that node N4, which has the common designation of "circle", responds to the wake-up broadcast propagated by node N3. As shown in FIG. 3, the SBR of node N4 is awakened by its Wake-Up Component and (1) node N4 propagates the wake-up broadcast received from node N3 by transmitting a wake-broadcast with the data construct 00010051; and (2) node N4 engages in Bluetooth communications with Node N3 via the SBRs. The awakened state of the SBR of node N4 is represented by the bold emphasis of node N4 in FIG. 3.

In addition, FIG. 3 illustrates that node N1 engages in Bluetooth communications with the gateway G1. In this regard, the gateway G1 preferably includes many, if not all, of the common designations that are shared by a plurality of nodes, including the "circle" and "triangle" common designations. This is illustrated in the table of FIG. 11, wherein the gateway has an "active" status for common designations identified by identifiers 1001-1006, including identifier 1001, assigned to the "circle" common designation, and 1005, assigned to the "triangle" common designation. The gateway G1 preferably does not include active status for common designations relating to the node attributes shown in FIG. 1, nor for the common designations representing the unique IDs of the nodes.

Accordingly, upon receiving the wake-up broadcast from node N1 shown in FIG. 2, the SBR of the gateway G1 was awakened by the Wake-Up Component of the node for engaging in Bluetooth communications with node N1 as shown in FIG. 3, and its awakened state is represented by the bold emphasis of the gateway G1 in FIG. 3. Furthermore, as shown, the wake-up broadcast is not propagated by the gateway.

It should further be appreciated that a node does not propagate the wake-up broadcast more than once. Each wake-up broadcast is screened based on the common designation, node ID, and transmission count from that node ID as identified in the data construct of the broadcast, and a wake-up broadcast having a matching data construct is not transmitted if there is an indication that such a wake-up broadcast has already been transmitted. Preferably, a list having a predetermined number of entries is maintained, with the oldest entries being discarded as new entries are added once the list has been populated.

Figure 4:
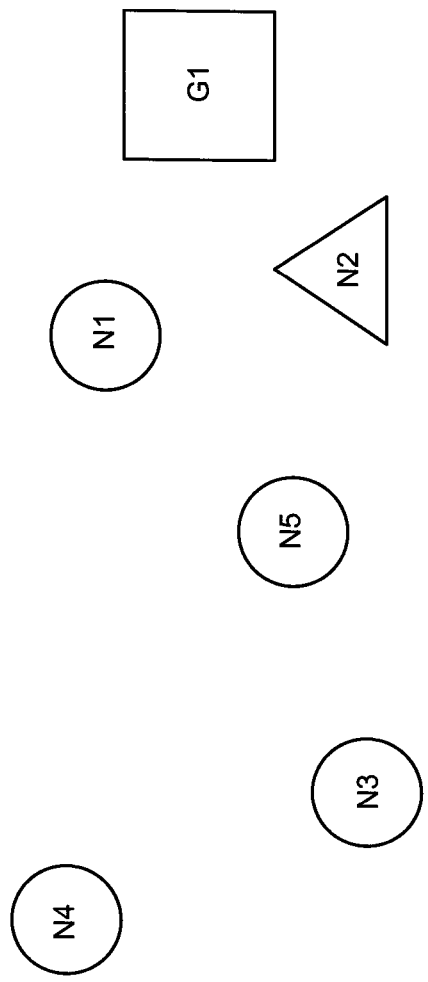
FIG. 4 illustrates the nodes of FIG. 1 during a period of inactivity of transmissions between the nodes.

FIG. 4 illustrates a period of inactivity of transmissions between the nodes. During this period all of the SBRs of the nodes are dormant, as represented by the lack of any bold emphasis of any of the nodes. During this period, external communications may be occurring, for example with an external server based on the Bluetooth communications between node N1 and gateway G1 illustrated in FIG. 3.

Figure 5:
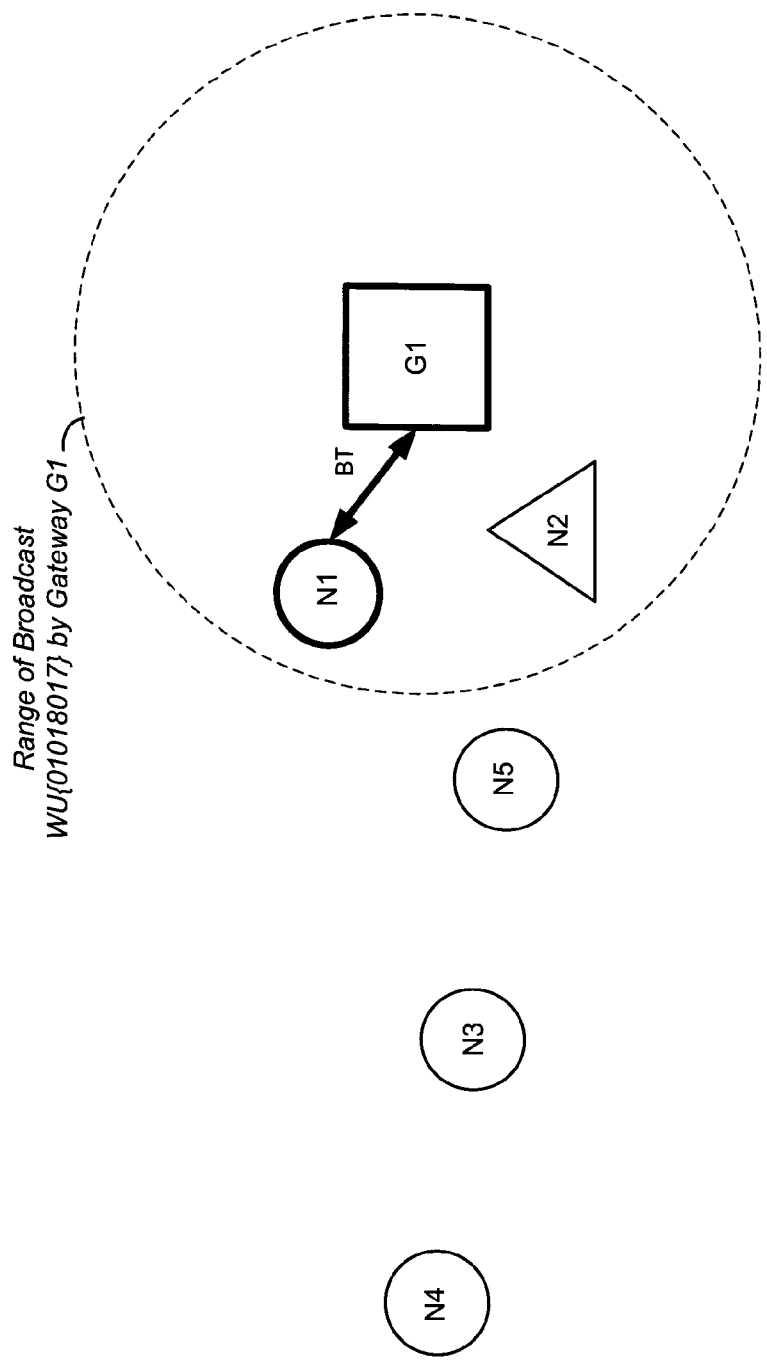
FIG. 5 illustrates the nodes of FIG. 1, wherein gateway G1 sends out a wake-up broadcast targeting node N1 and engages in Bluetooth communications with node N1.

FIG. 5 illustrates the next sequence of events in the present example. In FIG. 5, the SBR of the gateway G1 has been activated in response to a communication received from the external network for receipt by node N5. The message may be, for example, an acknowledgement, intended for node N5, of receipt of a message by a server.

In response, the gateway G1 transmits a wake-up broadcast that is targeted specifically for node N1. In this regard, the gateway G1 preferably knows the pathway to node N5 based at least upon the receipt of the message communicated via Bluetooth from node N5 to the gateway G1 by way of node N1. Such pathway identification preferably is accomplished using the deterministic and nondeterministic methodologies disclosed, for example, in the incorporated U.S. Patent Appl. Publication No. US 2007/0002792.

It furthermore will be appreciated that, although node N2 was within the range of the wake-up broadcast of gateway G1, no common designation of node N2 is included in the data construct of the broadcast (indeed, it was specifically targeted for node N1). Thus, node N2 did not "wake up" in response to the broadcast and, specifically, the SBR of node N2 was not activated. Nevertheless, node N2 "heard" the wake-up broadcast from gateway G1 and made note of the following networking information revealed by such wake-up broadcast: (1) the confirmed presence of gateway G1 (identified by node ID 0801) within a single hop from node N2; and (2) the presence of node N1 (identified by the wake-up identifier "0101") presumed by gateway G1 to be within the broadcast range of node G1.

Figure 6:
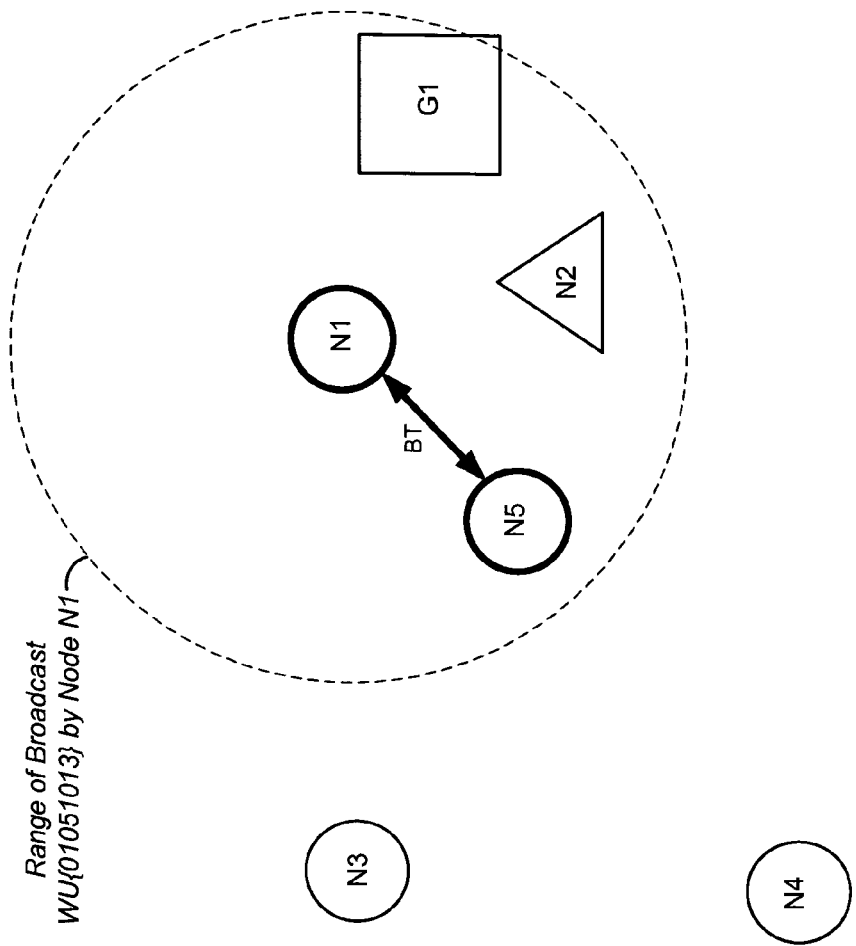
FIG. 6 illustrates the nodes of FIG. 1, wherein node N1 sends out a wake-up broadcast targeting node N5 and engages in Bluetooth communications with node N5.

FIG. 6 illustrates node N1 transmission by node N1 of a wake-up broadcast targeting node N5 and the consequent Bluetooth communications engaged between node N1 and node N5. In particular, the node N1 transmits a wake-up broadcast that is intended specifically for node N5. Preferably, node N1 knows the pathway to node N5 based at least upon the prior communications with node N1 illustrated in connection with FIGS. 1-2. Again, such pathway identification preferably is accomplished using the deterministic and nondeterministic methodologies disclosed, for example, in the incorporated U.S. Patent Appl. Publication No. US 2007/0002792. Also shown in FIG. 6, once the SBR of node N5 is awaken, Bluetooth communications commence between the SBRs of node N5 and node N1.

Additionally, it should again be noted that although node N2 is within the range of the wake-up broadcast transmitted by node N1, no common designation of node N2 is included in the data construct of the broadcast (indeed, it was specifically targeted for node N5). Thus, node N2 did not "wake up" in response to the broadcast and, specifically, the SBR of node N2 was not activated. Nevertheless, node N2 "heard" the wake-up broadcast from node N1 and made note of the following networking information revealed by such wake-up broadcast: (1) the confirmed presence of node N1 (identified by node ID 0101) within a single hop from node N2; and (2) the presence of node N5 (identified by the wake-up identifier "0105") presumed by node N1 to be within the broadcast range of node N1.

As referenced previously, FIG. 7 illustrates an exemplary data construct as found in the wake-up broadcasts (WU) of FIGS. 1-6. As described above, the eight digit number shown in brackets by "WU" represents the hexadecimal equivalent of the 32 bit data construct format shown in FIG. 7. Moreover, while the data construct shown is 32 bits, it will be appreciated that any number of bits may be selected depending upon the number of possible wake-up identifiers, node IDs, and counts that are desired to be accommodated in implementing the present invention, and depending upon any other networking information that may be desired to be included in the wake-up broadcast.

Figure 8:
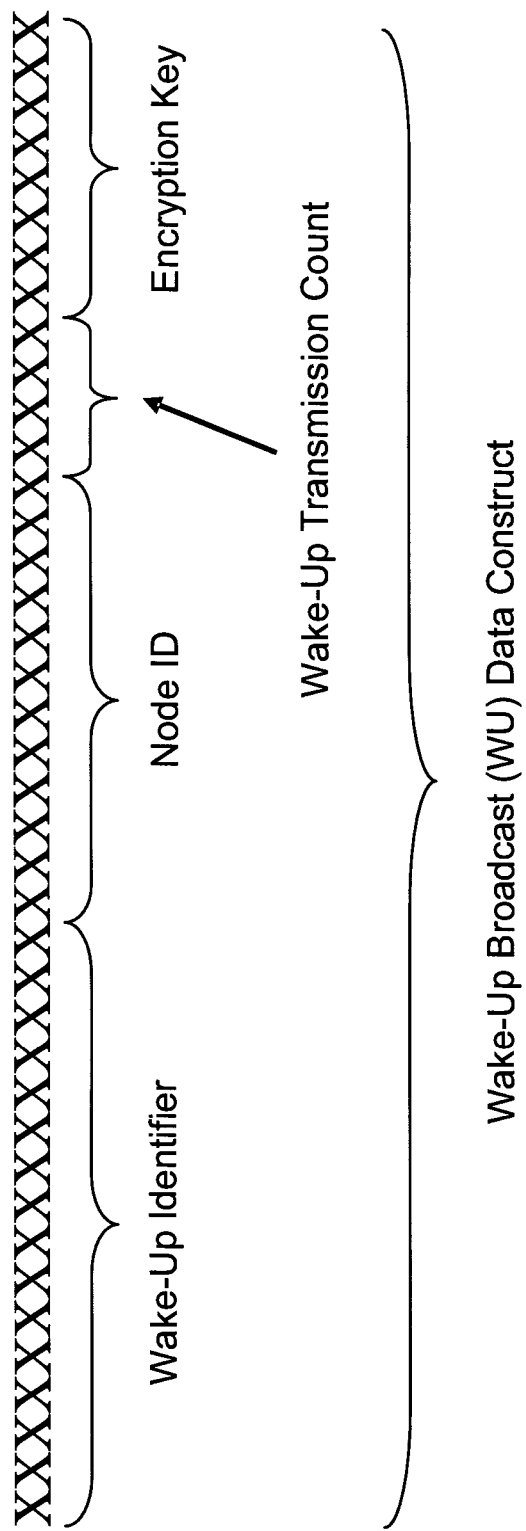
FIG. 8 illustrates a second exemplary data construct that is included in the wake-up broadcast in accordance with the present invention.

For example, FIG. 8 illustrates another exemplary data construct that may included in the wake-up broadcast (WU) in accordance with the present invention. In this example, the first 32 bits of the data construct represent the same pieces of information represented by the first 32 bits of the data construct of FIG. 7; however, the data construct includes an additional eight bits (for a total of 40 bits) wherein the additional last eight bits represent an encryption key. The encryption key may be utilized in symmetric or asymmetric encryption. In some contemplated embodiments, the encryption key is a public key. Preferably, each authorized data communication device is configured to use the encryption key to decrypt one or more pieces of the information contained in the data construct. The encrypted portions may include, for example, the wake-up identifier and/or the node ID. Nodes or other devices that do not have the ability to decrypt the information will not be able to contact the nodes or join the network. Moreover, hacking the network will be more difficult.

Instead of, or in addition to, using the encryption key to decrypt one or more portions of the wake-up broadcast, the encryption key may be utilized by the SBR to decrypt communications conducted via the SBR of the node. Provision of the encryption key via wake-up broadcasts for use in decrypting communications via SBRs represents an additional layer of network security, as SBRs may not necessarily be able to communicate with Wake-Up Components, especially when Wake-Up Transceivers are utilized. In such scenarios, two different avenues of communications are enabled with the encryption key being provided through one avenue for use in decrypting communications received via the second avenue.

It also should be appreciated that the encryption key could be used to encrypt communications by the node in addition to or rather than decrypting communications.

Figure 9:
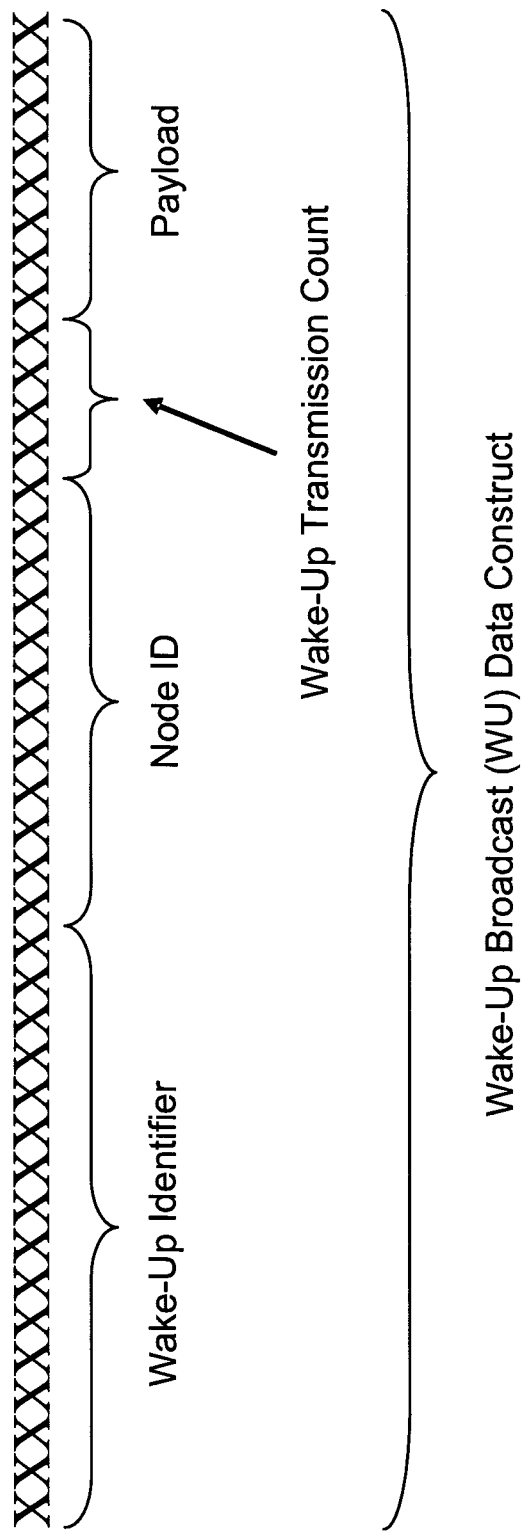
FIG. 9 illustrates a third exemplary data construct that is included in the wake-up broadcast in accordance with the present invention.

Still yet, FIG. 9 illustrates an third exemplary data construct that may be included in the wake-up broadcast (WU) in accordance with the present invention. In this example, the first 32 bits of the data construct represent the same pieces of information represented by the first 32 bits of the data construct of FIG. 7; however, the data construct includes an additional eight bits (for a total of 40 bits) wherein the additional last eight bits represents a payload of the wake-up broadcast in which a message or other data may be transmitted via the Wake-Up Components of the nodes. The payload data may include network information or may include information unrelated to the network itself. Such payload information may include, for example, application-specific data for an application executed by a destination node, an indication of the status of a sensor associated with a node (such as a seal or temperature sensor), and the like.

FIG. 10 illustrates an exemplary table of wake-up identifiers that may be maintained, for example, by node N2 in accordance with the present invention. As shown in FIG. 10, node N2 includes the following common designations: "0102" representing the unique node ID 102 of the node N2; "1000" representing a general wake-up identifier which all nodes preferably share; "1002" representing a "polygon" common designation; "1005" representing a "triangle" common designation; "1006" representing an "isosceles triangle" common designation; "3001" representing an attribute of the node, namely, that a gateway is available for communications to/from the node; and "3002" representing another attribute of the node, namely, that the node is located for communications directly with a gateway.

It will be appreciated that information noted by a node may be utilized to effect various functions. For example, as was described previously, node N2 "heard" the wake-up broadcast from gateway G1 and made note of certain networking information, including the confirmed presence of gateway G1 (identified by node ID 0801) within a single hop from node N2. If such information was previously unknown to node N2 (i.e., if the status for the wake-up identifier "3002" was previously set to inactive), then node N2 may, in response to the discovery of this information, change the status from inactive to active.

It will be understood that the foregoing wake-up identifiers are presented simply for illustration of the invention only. One of countless alternative implementations is described in incorporated U.S. provisional patent application Ser. No. 60/890,990. Indeed, it is certainly contemplated that commercial implementations of the invention will include different identifiers more commercially meaningful and relevant than mere geometric shapes. For example, commercial implementations of the present invention are particularly suited for use in asset tracking networks, asset monitoring networks, sensor data-acquisition networks, and combinations thereof. Such networks are disclosed, for example, in incorporated U.S. Pat. Nos. 6,934,540 and 6,745,027, both of which relate to class-based networks for tracking and/or monitoring assets.

For example, in asset tracking/monitoring applications, such different wake-up identifiers could include classes corresponding to televisions, appliances, and consumer electronics; with supersets including Sony, Whirlpool, and Phillips; and with subsets including plasma televisions, dishwashers, and electric razors. In sensor network implementations, such different wake-up identifiers could include common designations corresponding to each different type of sensor; each different location or area of the sensors; and each manufacturer of the sensors. If the sensor networks are deployed for or on the behalf of third parties as part of commercial services offered, then wake-up identifiers further could include common designations corresponding to each different customer or each different location of the customer where such services are utilized.

FIG. 11 illustrates an exemplary table of wake-up identifiers that may be maintained by gateway G1 in accordance with the present invention. As shown in FIG. 11, gateway G1 includes the following common designations: "0801" representing the unique gateway ID 101 of the gateway G1; "1000" representing a general wake-up identifier which all nodes (including gate way nodes) preferably share; "1001" representing a "circle" common designation; "1002" representing a "polygon" common designation; "1003" representing a "rectangle" common designation; "1004" representing a "square" common designation; "1005" representing a "triangle" common designation; and "1006" representing an "isosceles triangle" common designation.

As will now be appreciated from the foregoing description, nodes in common designation networks that utilize Wake-Up Components have great listening capacity. By simply listening with its Wake-Up Component and recording networking information gleaned from wake-up broadcasts, a node can greatly improve its performance as well as the overall network performance. Indeed, many advantages can be gained by simply facilitating network communications. By providing network information in the wake-up broadcasts, nodes are able to more efficiently make network connections and communicate with desired nodes and/or an external network. For example, just by listening and noting network information in a wake-up broadcast, a node can determine that it is only a single hop to a gateway without having to do initiate its own pathway query. The time previously required in certain situations for a node or gateway to communicate with a data communications device that is within range thus can be reduced. The opportunities for RF collision, which could delay network communications, also is reduced. Battery power also is conserved by reducing the number of times that an SBR needs to be activated from its dormant state. In contrast to these benefits, the small amount of networking data provided in the wake-up broadcasts does not overburden the simple Wake-Up Components, and thus the invention provides important advantages with little cost.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. In the operation of an ad hoc wireless network utilizing a data communication device as a node of the network, the data communication device including both,
    a two-way communications component comprising a first receiver and transmitter, and
    a second receiver,
wherein the second receiver activates the two-way communications component from a dormant state upon receipt by the second receiver of a wake-up broadcast that includes a wake-up identifier of the data communication device,
    a method of providing information via the second receiver, which information is auxiliary to the wake-up of the two-way communications component, the method comprising:
        (a) receiving, via the second receiver of the data communications device, a wake-up broadcast including a data construct comprising a wake-up identifier and the auxiliary information; and
        (b) determining, at the data communication device, that the wake-up identifier of the received wake-up broadcast does not correspond to the wake-up identifier of the data communication device and, thereby, not activating the two-way communications component from the dormant state based upon the received wake-up broadcast,
            (i) processing, at the data communication device irrespective of whether the wake-up identifier of the received wake-up broadcast corresponds to the wake-up identifier of the data communication device and irrespective of whether the two-way communications component is in the dormant state, the received auxiliary information to ascertain networking information; and
            (ii) storing, at the data communication device, data representing the ascertained networking information;
            (iii) wherein the auxiliary information comprises a node identification from which the wake-up broadcast is transmitted;
            (iv) wherein the ascertained networking information includes the confirmed presence of another node of the network within a single hop from the data communication device, such information being ascertained based on the node identification from which the wake-up broadcast was transmitted; and
            (v) wherein the ascertained networking information includes the presumed presence of a node corresponding to the wake-up identifier of the received wake-up broadcast.

2. The method of claim 1, wherein the auxiliary information comprises a transmission count regarding wake-up broadcasts transmitted by a node.

3. The method of claim 1, wherein the auxiliary information comprises an encryption key.

4. The method of claim 1, wherein the auxiliary information comprises application specific data.

5. The method of claim 1, wherein the auxiliary information comprises an indication of the status of a sensor.

6. The method of claim 1, wherein the second receiver draws substantially less current while listening for a wake-up broadcast than the two-way communications component would draw while listening for a wake-up broadcast.

7. The method of claim 1, wherein the second receiver draws less current while listening for a wake-up broadcast than the two-way communications component would draw while listening for a wake-up broadcast, the difference in current draw being at least an order of magnitude (such as milliamps versus microamps).

8. The method of claim 1, wherein the second receiver utilizes a stepped wake-up sequence based on at least two criteria, and wherein the last criteria before awakening the two-way communications component comprises identifying a wake-up identifier of the data communication device in the wake-up broadcast.

9. The method of claim 1, wherein the second receiver is part of a wake-up transceiver, the wake-up transceiver further comprising a second transmitter of the data communication device that is configured to transmit a wake-up broadcast for receipt by another wake-up receiver of another data communication device.

10. The method of claim 1, wherein the data communication device is a node in a common designation wireless ad hoc sensor network.

11. The method of claim 1, wherein the data communication device is a node in a class based wireless ad hoc network.

12. In the operation of an ad hoc wireless network utilizing a data communication device as a node of the network, the data communication device including both,
    a two-way communications component comprising a first receiver and transmitter, and
    a second receiver,
wherein the second receiver activates the two-way communications component from a dormant state upon receipt by the second receiver of a wake-up broadcast that includes a wake-up identifier of the data communication device,
    a method of receiving information by the data communication device via the second receiver, which information is auxiliary to the wake-up of two-way communications component, the method comprising:

receiving, via the second receiver of the data communications device, a wake-up broadcast, the wake-up broadcast including a data construct comprising a wake-up identifier and the auxiliary information; and activating, in response to receipt of the wake-up broadcast, the two-way communications component from a dormant state if a wake-up identifier of the data communications device is found in the wake-up broadcast, and not activating, in response to receipt of the wake-up broadcast and irrespective of whether a wake-up identifier of the data communication device is found in the wake-up broadcast, the two-way communications component from a dormant state if a wake-up identifier of the data communications device is not found in the wake-up broadcast, (i) processing, at the data communication device irrespective of whether the wake-up identifier of the received wake-up broadcast corresponds to the wake-up identifier of the data communication device and irrespective of whether the two-way communications component is in the dormant state, the received auxiliary information to ascertain networking information; and (ii) recording, at the data communication device, data representing the ascertained networking information;

(iii) wherein the auxiliary information comprises a node identification from which the wake-up broadcast is transmitted;

(iv) wherein the ascertained networking information includes the confirmed presence of another node of the network within a single hop from the data communication device, such information being ascertained based on the node identification from which the wake-up broadcast was transmitted; and (v) wherein the ascertained networking information includes the presumed presence of a node corresponding to the wake-up identifier of the received wake-up broadcast.

13. The method of claim 12, wherein the auxiliary information comprises a transmission count regarding wake-up broadcasts transmitted by a node.

14. The method of claim 12, wherein the auxiliary information comprises an encryption key.

15. The method of claim 12, wherein the auxiliary information comprises application specific data.

16. The method of claim 12, wherein the auxiliary information comprises an indication of the status of a sensor.

17. The method of claim 12, wherein the second receiver draws substantially less current while listening for a wake-up broadcast than the two-way communications component would draw while listening for a wake-up broadcast.

18. The method of claim 12, wherein the second receiver draws less current while listening for a wake-up broadcast than the two-way communications component would draw while listening for a wake-up broadcast, the difference in current draw being at least an order of magnitude (such as milliamps versus microamps).

19. The method of claim 12, wherein the second receiver utilizes a stepped wake-up sequence based on at least two criteria, and wherein the last criteria before awakening the two-way communications component comprises identifying a wake-up identifier of the data communication device in the wake-up broadcast.

20. The method of claim 12, wherein the second receiver is part of a wake-up transceiver, the wake-up transceiver further comprising a second transmitter of the data communication device that is configured to transmit a wake-up broadcast for receipt by another wake-up receiver of another data communication device.

21. The method of claim 12, wherein the data communication device is a node in a common designation wireless ad hoc sensor network.

22. The method of claim 12, wherein the data communication device is a node in a class based wireless ad hoc network.

23. The method of claim 12, further comprising using the auxiliary information by the data communication device for facilitating network communications by the two-way communications component.

24. The method of claim 23, wherein the auxiliary information comprises network information that is reviewed by the data communication device when determining network paths for communicating with a desired node, whereby network communications are facilitated.

25. The method of claim 24, wherein the network information includes the identification of one or more nodes that are within direct communication range of the data communication device.

26. The method of claim 24, wherein the network information includes the identification of a gateway node that is within direct communication range of the data communication device.

27. The method of claim 24, wherein the network information includes the identification of one or more nodes from which wake-up broadcasts have been received, either directly or indirectly, by the second wake-up receiver.

28. The method of claim 24, wherein the network information includes the identification of one or more common designations from which wake-up broadcasts have been received, either directly or indirectly, by the second wake-up receiver.

29. An ad hoc wireless network system, comprising:
(a) an ad hoc wireless network utilizing a plurality of data communication devices as nodes of the network;
(b) wherein each data communication device includes both,
    (i) a two-way communications component comprising a first receiver and transmitter, and
    (ii) a second receiver, wherein the second receiver activates the two-way communications component from a dormant state upon receipt by the second receiver of a wake-up broadcast that includes a wake-up identifier of the data communication device, and wherein the second receiver does not activate the two-way communications component from the dormant state upon receipt by the second receiver of a wake-up broadcast that does not include a wake-up identifier of the data communication device;
    (iii) wherein information is provided via each second receiver, which information is auxiliary to the wake-up of the two-way communications component, by transmitting a wake-up broadcast, which the second receiver is capable of receiving, that includes a data construct comprising a wake-up identifier and the auxiliary information, the auxiliary information including a node identification from which the wake-up broadcast is transmitted;
(c) wherein each data communication device is configured to process auxiliary information of wake-up broadcasts received via its second receiver, irrespective of whether the wake-up identifier of the received wake-up broadcast corresponds to its wake-up identifier and irrespective of whether the two-way communications component is in the dormant state, to ascertain networking information, and to record data representing the ascertained networking information;

(d) wherein the ascertained networking information includes the confirmed presence of another node of the network within a single hop from the data communication device, such information being ascertained based on the node identification, in received auxiliary information, of a node from which a wake-up broadcast was transmitted; and (e) wherein the ascertained networking information includes the presumed presence of a node corresponding to the wake-up identifier of a received wake-up broadcast.

30. A data communication device for utilization as a node in an ad hoc wireless network, comprising:

(a) a two-way communications component comprising a first receiver and transmitter; and (b) a second receiver, wherein the second receiver activates the two-way communications component from a dormant state upon receipt by the second receiver of a wake-up broadcast that includes a wake-up identifier of the data communication device;

(c) wherein information is provided via the second receiver, which information is auxiliary to the wake-up of the two-way communications component, by transmitting a wake-up broadcast, which the second receiver is capable of receiving, that includes a data construct comprising a wake-up identifier and the auxiliary information, and does not activate the two-way communications component from the dormant state upon receipt by the second receiver of a wake-up broadcast that does not include a wake-up identifier of the data communication device;

(d) wherein each data communication device is configured to process auxiliary information of wake-up broadcasts received via its second receiver, irrespective of whether the wake-up identifier of the received wake-up broadcast corresponds to its wake-up identifier and irrespective of whether the two-way communications component is in the dormant state, to ascertain networking information, and to record data representing the ascertained networking information;

(e) wherein the ascertained networking information includes the confirmed presence of another node of the network within a single hop from the data communication device, such information being ascertained based on the node identification, in received auxiliary information, of a node from which a wake-up broadcast was transmitted; and (f) wherein the ascertained networking information includes the presumed presence of a node corresponding to the wake-up identifier of a received wake-up broadcast.

* * * * *